US010621118B1

(12) United States Patent
Iyer et al.

(10) Patent No.: US 10,621,118 B1
(45) Date of Patent: Apr. 14, 2020

(54) SYSTEM AND METHOD OF UTILIZING DIFFERENT MEMORY MEDIA WITH A DEVICE

(71) Applicant: Dell Products L.P., Round Rock, TX (US)

(72) Inventors: Shyamkumar Thiyagarajan Iyer, Austin, TX (US); Yogesh Varma, Austin, TX (US); Vadhiraj Sankaranarayanan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 15 days.

(21) Appl. No.: 16/177,657

(22) Filed: Nov. 1, 2018

(51) Int. Cl.
*G06F 13/16* (2006.01)
*G06F 13/28* (2006.01)

(52) U.S. Cl.
CPC .......... *G06F 13/1668* (2013.01); *G06F 13/28* (2013.01); *G06F 2213/28* (2013.01)

(58) Field of Classification Search
CPC .......... G06F 12/08; G06F 12/10; G06F 13/16; H04L 27/06
See application file for complete search history.

(56) References Cited

PUBLICATIONS

Kung, H. T., Trevor Blackwell, and Alan Chapman. "Credit-based flow control for ATM networks: credit update protocol, adaptive credit allocation and statistical multiplexing." *ACM SIGCOMM Computer Communication Review.* vol. 24. No. 4. ACM, 1994; 14 pages.

Billington, Jonathan, and Smit Saboo. "An investigation of credit-based flow control protocols." *Proceedings of the 1st international conference on Simulation tools and techniques for communications, networks and systems & workshops.* ICST (Institute for Computer Sciences, Social-Informatics and Telecommunications Engineering), 2008; 10 pages.
Gasulla, Javier Prades. "A New Credit-Based End-to-End Flow Control Protocol for High Performance Interconnects." Universitat Politecnica De Valencia, Jul. 2015; 83 pages.
Intel Corporation. "NVDIMM Namespace Specification." Revision 1.0, Intel, Apr. 2015; 56 pages.

*Primary Examiner* — Getente A Yimer
(74) *Attorney, Agent, or Firm* — Baker Botts L.L.P.

(57) ABSTRACT

In one or more embodiments, one or more methods, processes, and/or systems may receive quality of service (QoS) configuration information associated with information storage and retrieval of a device coupled to an input/output memory management unit (IOMMU); may configure one or more registers of the memory controller with a range of addresses associated; may determine performance data based at least on one or more of an average number of transactions completed, an average number of cycles utilized by the transactions, and an average number of credits in a flow control between the memory controller and a first memory medium coupled to the memory controller; may determine that the performance data does not comply with the QoS configuration information; and if the performance data indicates that the information storage and retrieval of the device is congested, may remap the IOMMU to point to DMA buffers of a second memory medium.

17 Claims, 8 Drawing Sheets

SYSTEM AND METHOD OF UTILIZING DIFFERENT MEMORY MEDIA WITH A DEVICE

BACKGROUND

Field of the Disclosure

This disclosure relates generally to information handling systems and more particularly to utilizing different memory media with a device associated with an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, method, and/or processes may configure one or more registers of a memory controller with a range of addresses associated with a process or a virtual machine; may determine one or more of an average number of transactions completed in a period of time transpiring, an average number of cycles utilized by the transactions in the address range, and an average number of credits in a flow control between the memory controller and a first memory medium of multiple memory media coupled to the memory controller; may obtain a direct memory access (DMA) address range associated with a device coupled to an input/output memory management unit (IOMMU) of an information handling system; may determine performance data based at least on the one or more of the average number of transactions completed in the period of time transpiring, the average number of cycles utilized by the transactions in the address range, and the average number of credits in the flow control between the memory controller and the first memory medium; may determine that the performance data does not comply with the QoS configuration information; may determine if the performance data indicates that the information storage and retrieval of the device is congested; if the performance data indicates that the information storage and retrieval of the device is congested, may remap the IOMMU to point to DMA buffers of a second memory medium of the multiple memory media, different from the first memory medium; and if the performance data does not indicate that the information storage and retrieval of the device is congested, may remap the IOMMU to point to DMA buffers of a third memory medium of the multiple memory media, different from the first memory medium and different from the second memory medium. In one or more embodiments, the first memory medium may include storage class memory.

In one or more embodiments, if the performance data indicates that the information storage and retrieval of the device is congested, the one or more systems, method, and/or processes may further remap a memory management unit (MMU) to point to the DMA buffers of the second memory medium. In one or more embodiments, if the performance data does not indicate that the information storage and retrieval of the device is congested, the one or more systems, method, and/or processes may further remap the MMU to point to the DMA buffers of the third memory medium. In one or more embodiments, a latency associated with the second memory medium is less than a latency associated with the first memory medium and is less than a latency associated with the third memory medium. In one or more embodiments, a data throughput associated with the second memory medium is greater than a data throughput associated with the first memory medium and greater than a data throughput associated with the third memory medium. In one or more embodiments, a latency associated with the third memory medium is greater than a latency associated with the first memory medium. In one or more embodiments, the device may include at least one of a graphics processing unit (GPU), a peripheral component interconnect express (PCIe) device, a small computer system interface (SCSI) device, a serial attached SCSI (SAS) device, a universal serial bus (USB) device, a storage device, a fabric bus, a network interface, a host bus adapter, a device coupled to a docking station, the docking station, an Institute of Electrical and Electronics Engineers (IEEE) 1394 device, a serial advanced technology attachment (SATA) device, and an image acquisition device, among others.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1A:
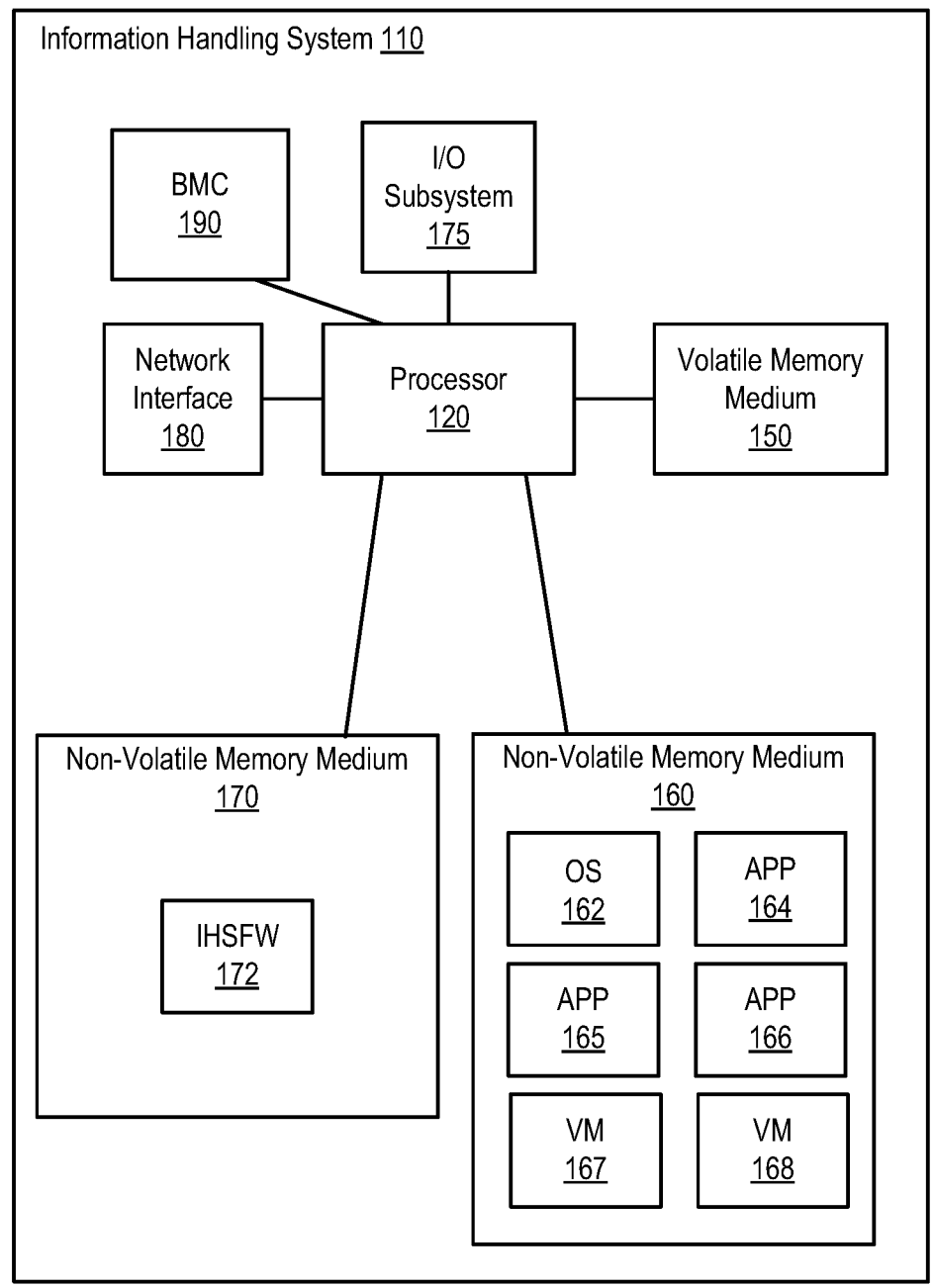
FIGS. 1A-1D illustrate examples of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, a device of associated with an information handling system may allocate memory from an operating system executing on the information handling system. For example, the device may allocate memory from "heap" memory. In one or more embodiments, an amount of time and/or processor cycles may be consumed when the operating system allocates memory for the device. For example, a device driver may utilize one or more subroutines of the operating system to allocate memory for the device. In one or more embodiments, the operating system may map memory allocated to the device. For example, the operating system may map memory allocated to the device for one or more direct memory access (DMA) systems and/or one or more DMA processes, among others. In one or more embodiments, the operating system may retain a page table entry associated with memory associated with the one or more DMA systems and/or the one or more DMA processes. For example, the operating system may operate more efficiently without retaining the page table entry associated with memory associated with the one or more DMA systems and/or the one or more DMA processes.

In one or more embodiments, a processor of an information handling system may not configure and/or may not access the memory allocated for the device until the device has stored data to the memory allocated for the device. For example an input/output memory management unit (IOMMU) may configure memory allocated for the device. In one or more embodiments, an IOMMU may be or include a memory management unit (MMU) that may be coupled a DMA-capable input/output (I/O) bus to a memory medium. For example, an IOMMU may translate virtual addresses to physical addresses. For instance, an IOMMU may map device-visible virtual addresses (e.g., device addresses, I/O addresses, etc.) to system physical addresses. In one or more embodiments, translating virtual addresses to physical addresses may include mapping virtual addresses to physical addresses. For example, translating virtual addresses to physical addresses may include mapping virtual addresses to system physical addresses. In one or more embodiments, storage for a device may be allocated without being contiguous in physical memory. For example, an IOMMU may map contiguous virtual addresses to fragmented physical addresses (e.g., fragmented system physical addresses). For instance, an IOMMU may be utilized in eliminating utilization of vectored I/O (e.g., scatter-gather lists).

In one or more embodiments, a device may not support an address space of a memory medium. For example, an IOMMU may be utilized so that the device may access the address space of the memory medium. For instance, copying buffers to and/or from a devices addressable memory space may be eliminated. In one or more embodiments, an IOMMU may provide memory protection from one or more malfunctioning devices and/or one or more malicious devices. For example, an IOMMU may not permit memory access by a device to a portion of a memory medium that is not mapped to the device. For instance, a device may not able to physically circumvent and/or corrupt configured memory management tables.

In one or more embodiments, a guest operating system may utilize hardware that is not specifically configured for virtualization. For example, a graphics card may utilize DMA, and in a virtual environment memory addresses may be re-mapped by a virtual machine and/or a hypervisor, which may cause one or more devices utilizing DMA to fail and/or malfunction. For instance, an IOMMU may manage and/or conduct a remapping that may permit and/or allow a native device driver to be utilized in a guest operating system. In one or more embodiments, an IOMMU may remap one or more hardware interrupts. In one or more embodiments, an IOMMU may provide peripheral memory paging. For example, a device utilizing a PCI-Express (PCIe) address translation services page request interface extension may determine and/or signal an urgency and/or a need of one or more memory manager services via an IOMMU.

In one or more embodiments, an IOMMU may provide a translation from I/O address space to a system physical address (SPA) space for multiple I/O accesses. For example, the translation, once established, may remain static. For instance, the translation may remain static until a translation lookaside buffer (TLB) shoot down, remapping, or de-mapping of the translation occurs. In one or more embodiments, storage class memories (SCMs) may be memories of information handling systems. In one or more embodiments, a static translation utilizing SCMs may not be optimal. For example, SCMs may be associated with non-deterministic latencies. For instance, the non-deterministic latencies may cause traffic congestion. In one or more embodiments, traffic congestion may cause slower processing of information. For example, traffic congestion may cause slower processing of information by one or more of an information handling system, a component of the information handling system, and a device associated with the information handling system, among others.

In one or more embodiments, an application and/or an I/O process may be associated with respective quality of service (QoS) requirements. In one or more embodiments, an operating system or a hypervisor may monitor an overall QoS. In one or more embodiments, a memory controller of an information handling system may receive QoS parameters via one or more registers of the memory controller. In one or more embodiments, the memory controller may monitor the QoS associated with one or more memory media. In one example, the QoS associated with the one or more memory media may include an average latency for reads associated with the one or more memory media and/or may include an average latency for writes associated with the one or more memory media. In another example, the QoS associated with the one or more memory media may include flow control measurements and/or timings, among others. In one or more embodiments, an operating system and/or a management application may determine performance of the one or more memory media. In one or more embodiments, the operating system and/or the management application may change a memory mapping based at least on the performance of the one or more memory media. For example, the memory mapping may be associated with an application and/or a device coupled to an IOMMU.

In one or more embodiments, a memory controller may be configured with a range of addresses associated with a process or a virtual machine. For example, the range of addresses associated with the process or the virtual machine may be associated with one or more DMA storage areas associated a device coupled to an IOMMU. For instance, the device may be or include one or more of a graphics processing unit (GPU), a PCIe device, a small computer system interface (SCSI) device, a serial attached SCSI (SAS) device, a universal serial bus (USB) device, a storage device, a fabric bus, a network interface, a host bus adapter, a device coupled to a docking station, the docking station, an Institute of Electrical and Electronics Engineers (IEEE) 1394 device, a serial advanced technology attachment (SATA) device, and an image acquisition device (e.g., a camera), among others.

In one or more embodiments, the memory controller may be configured to determine one or more of an average number of transactions completed in a period of time transpiring, an average number of cycles (e.g., memory bus cycles) utilized by the transactions in the address range, and an average number of credits in the flow control between the memory controller and a first memory medium. For example, after the memory controller is configured, I/O between the device and the first memory medium may be monitored. In one or more embodiments, the first memory medium may be or include storage class memory (SCM). In one or more embodiments, performance data may be determined based at least on the I/O between the device and the first memory medium. For example, performance data may be determined based at least on the one or more of the average number of transactions completed in the period of time transpiring, the average number of cycles utilized by the transactions in the address range, and the average number of credits in the flow control between the memory controller and the first memory medium. In one or more embodiments, performance data may be periodically determined. For example, periodically determining performance data may permit a workload, a process, and/or a job that utilizes the device to dynamically utilize different memory media based at least on QoS configuration information and/or memory I/O needs of the device. For instance, periodically determining performance data may permit the workload, the process, and/or the job that utilizes the device to dynamically utilize different memory media based at least on QoS configuration information and/or memory I/O needs of the device as the workload, the process, and/or the job processes information, produces information, and/or acquires information.

In one or more embodiments, a device writing data to and/or reading data from a memory medium may not be consistent and/or "smooth". For example, a device writing data to and/or reading data from a memory medium may be "bursty" (e.g., irregular data traffic flows). In one instance, bursty data traffic may be associated with a lack of predictability, where predictability may be associated with smooth data traffic. In another instance, bursty data traffic may be associated with one or more data traffic flows that may not last long enough to reach a steady state. In one or more embodiments, one or more systems, one or more processes, and/or one or more methods may utilize credit-based flow control in writing data to a memory medium and/or reading data from the memory medium. For example, a device, an IOMMU, and/or a memory controller may utilize credit-based flow control in writing data to a memory medium and/or reading data from the memory medium.

In one or more embodiments, a device may be associated with one or more credits. In one example, when the device writes data to a memory medium, a credit of the one or more credits may be deducted from the one or more credits. For instance, a credit may be deducted from a credit balance associated with the device. In another example, when the device reads data from a memory medium, a credit of the one or more credits may be deducted from the one or more credits. For instance, a credit may be deducted from a credit balance associated with the device. In one or more embodiments, after an amount of time transpiring, the device may have another credit associated with it. For example, after an amount of time transpiring, the device may have another credit added to its balance of none or one or more credits. For instance, the device may periodically have another credit added to its balance of one or more credits. In one or more embodiments, a device may be associated with two difference balances of none or one or more credits. In one example, the device may be associated with a balance of none or one or more for writing data to a memory medium. In one example, the device may be associated with a balance of none or one or more for reading data from a memory medium. In one or more embodiments, a component, entity, and/or a node may advertise and/or may provide one or more credit tokens to a peer to claim buffer availability. For example, if more credits are available, then the peer may send more data into one or more buffers. In one or more embodiments, a credit based flow control system between a memory controller and one or more devices may be to determine and/or to gather performance data (e.g., stats) for a QoS.

In one or more embodiments, after determining the performance data, it may be determined if the performance data complies with the QoS configuration information. In one example, if the performance data complies with the QoS configuration information, a scheduler may be returned to. For example, the scheduler may be or include a scheduler of an operating system. In another example, if the performance data does not comply with the QoS configuration information, it may be determined if the performance data indicates that I/O is congested. For example, it may be determined if the performance data indicates that I/O associated with the first memory medium and/or the device is congested. In one or more embodiments, if the performance data does not comply with the QoS configuration information, an interrupt of the memory controller may be raised.

If the performance data indicates that the I/O is congested, the IOMMU may be remapped to point to DMA buffers of a second memory medium. In one or more embodiments, the device may utilize one or more virtual addresses. For example, the one or more virtual addresses may have been mapped to one or more physical addresses of the first memory medium. For instance, the one or more virtual addresses, utilized by the device, may be mapped to one or more physical addresses of the second memory medium. In one or more embodiments, after remapping the IOMMU to point to the DMA buffers of the second memory medium, the device may continue to utilize the same one or more virtual addresses. For example, the device may continue to utilize the same one or more virtual addresses to access the DMA buffers of the second memory medium.

If the performance data does not indicate that the I/O is congested, the IOMMU may be remapped to point to DMA buffers of a third memory medium. In one or more embodiments, the third memory medium may be different from the first memory medium and may be different from the second memory medium. In one or more embodiments, the device may utilize one or more virtual addresses. For example, the one or more virtual addresses may have been mapped to one or more physical addresses of the first memory medium. For instance, the one or more virtual addresses, utilized by the device, may be mapped to one or more physical addresses of the third memory medium. In one or more embodiments, after remapping the IOMMU to point to the DMA buffers of the third memory medium, the device may continue to utilize the same one or more virtual addresses. For example, the device may continue to utilize the same one or more virtual addresses to access the DMA buffers of the third memory medium.

In one or more embodiments, the DMA address range of the process or the VM may be updated. In one example, the DMA address range of the process or the VM may be updated with information associated with the DMA buffers of the second memory medium, if the performance data indicates that the I/O is congested. In another example, the DMA address range of the process or the VM may be updated with information associated with the DMA buffers of the third memory medium, the performance data does not indicate that the I/O is congested.

Turning now to FIG. 1A, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a USB, a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, a network interface 180, a baseboard management controller (BMC) 190, and a device 190. As illustrated, volatile memory medium 150, non-volatile memory media 160 and 170, I/O subsystem 175, network interface 180, BMC 190, and device 190 may be communicatively coupled to processor 120.

In one or more embodiments, one or more of volatile memory medium 150, non-volatile memory media 160 and 170, I/O subsystem 175, network interface 180, BMC 190, and device 190 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCIe root complexes. In another example, one or more of an I/O subsystem 175 and a network interface 180 may be communicatively coupled to processor 120 via one or more PCIe switches. In one or more embodiments, a system physical address space (SPA) may include addresses of one or more of volatile memory medium 150, non-volatile memory media 160 and 170, I/O subsystem 175, network interface 180, BMC 190, and device 190, among others. For example, one or more of volatile memory medium 150, non-volatile memory media 160 and 170, I/O subsystem 175, network interface 180, BMC 190, and device 190, among others, may be included in a SPA of IHS 110.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of SCSI, SAS or another transport that operates with the SCSI protocol, advanced technology attachment (ATA), SATA, a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150-170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150-170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, applications (APPs) 164-166, and virtual machines (VMs) 167 and 168. In one or more embodiments, one or more of OS 162, APPs 164-166, and VMs 167 and 168 may include processor instructions executable by processor 120. In one example, processor 120 may execute processor instructions of one or more of OS 162, APPs 164-166, and VMs 167 and 168 via non-volatile memory medium 160. In another example, one or more portions of the processor instructions of the one or more of OS 162, APPs 164-166, and VMs 167 and 168 may be transferred to volatile memory medium 150, and processor 120 may execute the one or more portions of the processor instructions of the one or more of OS 162, APPs 164-166, and VMs 167 and 168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, BMC 190 may be or include a remote access controller. For example, the remote access controller may be or include a Dell Remote Access Controller (DRAC). In one or more embodiments, a remote access controller may be integrated into IHS 110. For example, the remote access controller may be or include an integrated Dell Remote Access Controller (iDRAC). In one or more embodiments, a remote access controller may include one or more of a processor, and a memory, a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. For example, the remote access controller may be based at least on an Intelligent Platform Management Interface (IPMI) standard. For instance, the remote access controller may allow and/or permit utilization of IPMI out-of-band interfaces such as IPMI Over LAN (local area network). In one or more embodiments, a remote access controller may include and/or provide one or more internal private networks. For example, the remote access controller may include and/or provide one or more of an Ethernet interface, a front panel USB interface, and a Wi-Fi interface, among others.

In one or more embodiments, BMC 190 may be or include a microcontroller. For example, the microcontroller may be or include an 8051 microcontroller, an ARM Cortex-M (e.g., Cortex-M0, Cortex-M0+, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 190 may be configured, coded, and/or encoded with instructions in accordance with one or more of systems, flowcharts, methods, and/or processes described herein. In one or more embodiments, BMC 190 may be configured to implement at least a portion of one or more systems, one or more flowcharts, one or more methods, and/or one or more processes described herein. In one or more embodiments, BMC 190 may be or include one or more of a field programmable gate array (FPGA) and an ASIC, among others, configured, coded, and/or encoded with instructions in accordance with at least a portion of one or more of systems, one or more flowcharts, one or more methods, and/or one or more processes described herein.

In one or more embodiments, processor 120 and one or more components of IHS 110 may be included in a system-on-chip (SoC). For example, the SoC may include processor 120 and a platform controller hub (not specifically illustrated).

Figure 1B:
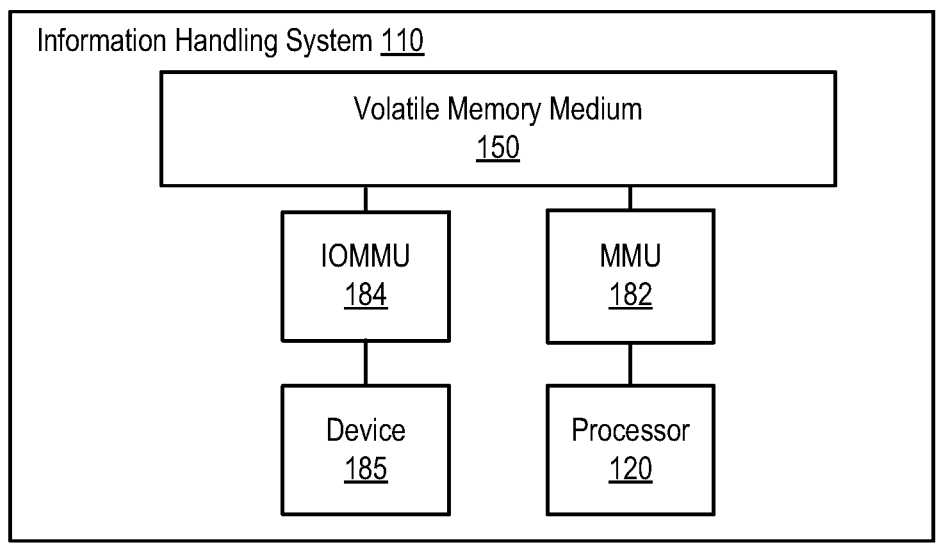
Figure 1C:
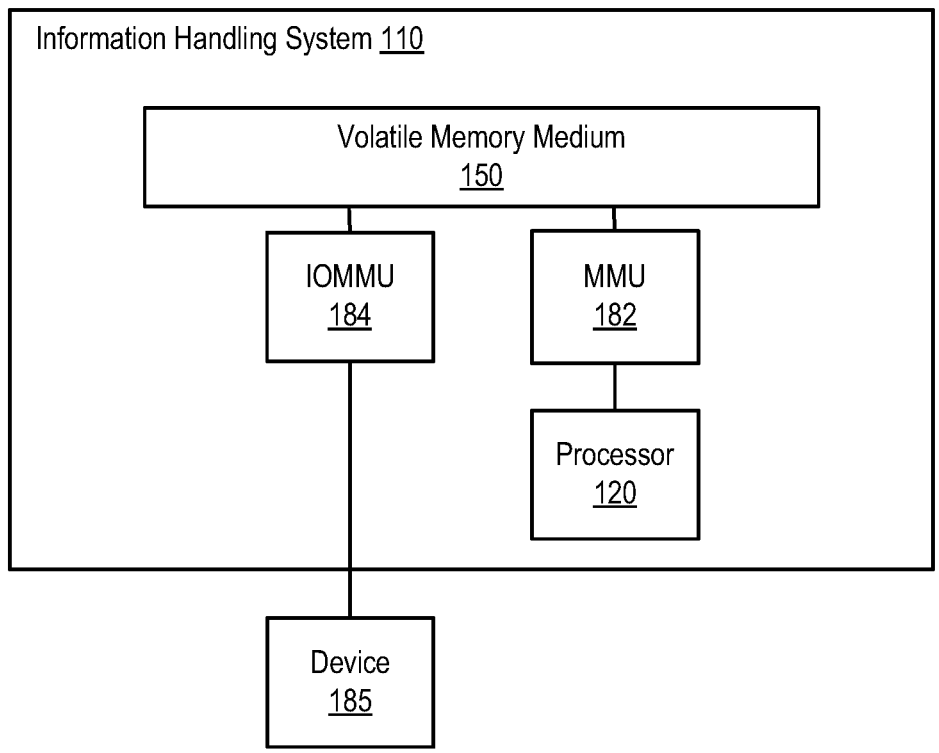

Turning now to FIGS. 1B and 1C, examples of a device coupled to an input/output memory management unit are illustrated, according to one or more embodiments. As shown, processor 120 may be coupled to a MMU 182, which may be coupled to volatile memory medium 150. As illustrated, a device 185 may be coupled to an IOMMU 184, which may be coupled to volatile memory medium 150. In one or more embodiments, an information handling system may include a device. For example, IHS 110 may include device 185, as shown in FIG. 1B. In one or more embodiments, a device may be coupled to an information handling system. For example, device 185 may be coupled to IHS 110, as illustrated in FIG. 1C. In one or more embodiments, device 185 may be or include one or more of a GPU, a PCIe device, a SCSI device, a SAS device, a USB device, a storage device, a fabric bus, a network interface, a host bus adapter, a device coupled to a docking station, a dock device (e.g., a docking station), an IEEE 1394 device, a SATA device, and an image acquisition device (e.g., a camera), among others.

Figure 1D:
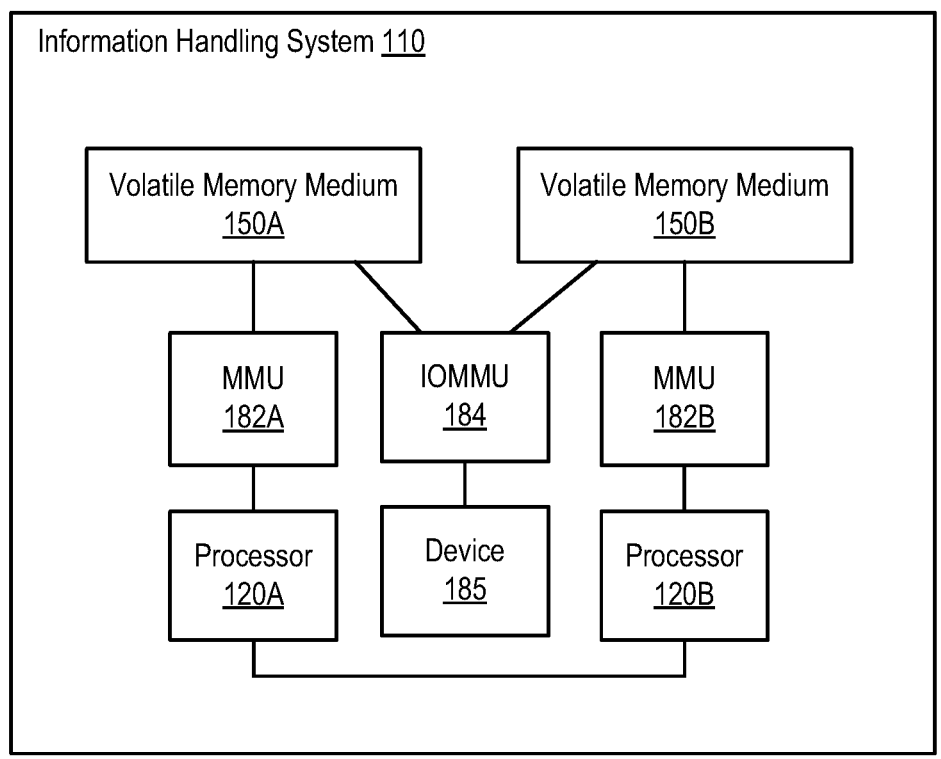

Turning now to FIG. 1D, an example of a device and multiple processors is illustrated, according to one or more embodiments. As shown, a processor 120A may be coupled to a MMU 182A, which may be coupled to a volatile memory medium 150A. As illustrated, a processor 120B may be coupled to a MMU 182B, which may be coupled to a volatile memory medium 150B. As shown, processor 120A may be communicatively coupled to processor 120B. In one or more embodiments, processor 120A may be communicatively coupled to processor 120B via a memory medium. For example, processor 120A may be communicatively coupled to processor 120B via a cache. In one instance, the cache may be or include a level one cache. In a second instance, the cache may be or include a level two cache. In another instance, the cache may be or include a level three cache. As illustrated, device 185 may be coupled to IOMMU 184, which may be coupled to volatile memory media 150A and 150B.

In one or more embodiments, device 185 may provide and/or receive data to and/or from a processor via a memory medium. In one example, device 185 may provide and/or receive data to and/or from processor 120A via memory medium 150A. In another example, device 185 may provide and/or receive data to and/or from processor 120A via memory medium 150B. For instance, processor 120A may provide and/or receive data to and/or from medium 150B via processor 120B.

In one or more embodiments, IOMMU 184 may allocate storage from medium 150A when device 185 may provide and/or receive data to and/or from processor 120A. For example, allocating storage from medium 150A when device 185 may provide and/or receive data to and/or from processor 120A may reduce communication overhead. For instance, processor 120B may not be involved in providing and/or receiving data to and/or from processor 120A and device 185. In one or more embodiments, allocating storage from medium 150A when device 185 may provide and/or receive data to and/or from processor 120A may reduce one or more data storage and/or retrieval latencies.

Figure 1E:
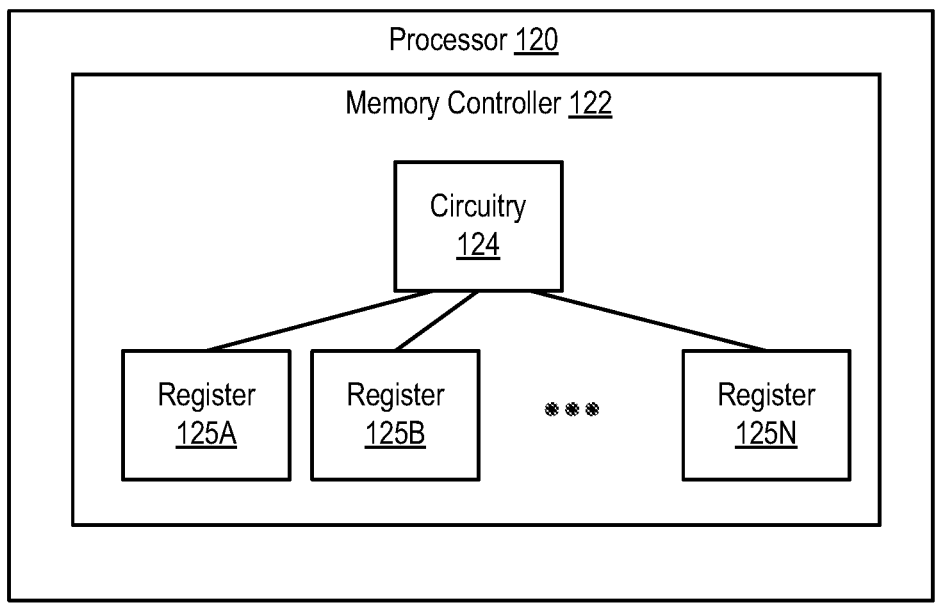
FIG. 1E illustrates an example of a processor, according to one or more embodiments.

Turning now to FIG. 1E, an example of a processor is illustrated, according to one or more embodiments. As shown, processor 120 may include a memory controller 122. As illustrated, memory controller 122 may include circuitry 124. In one or more embodiments, circuitry 124 may be configured to implement at least a portion of one or more systems, one or more flowcharts, one or more methods, and/or one or more processes described herein. As shown, memory controller 122 may include registers 125A-125N. As illustrated, registers 125A-125N may be coupled to circuitry 124. In one or more embodiments, registers 125A-125N may store information. In one example, one or more of registers 125A-125N may store configuration information. In a second example, one or more of registers 125A-125N may store performance information. In another example, one or more of registers 125A-125N may store status information.

Figure 1F:
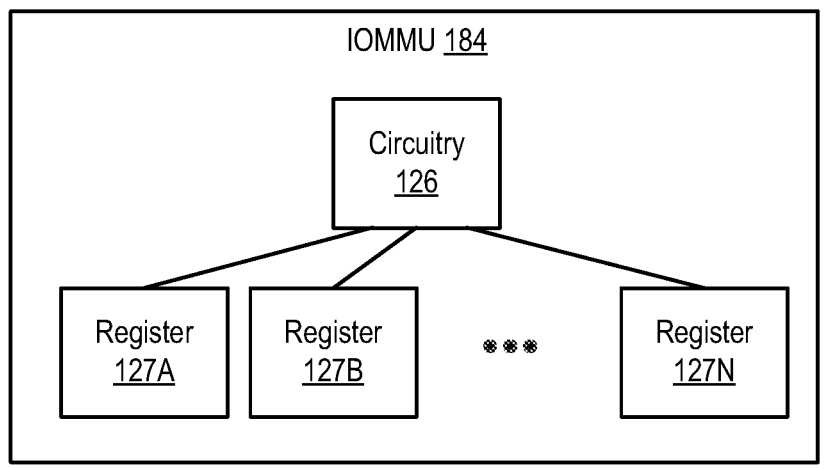
FIG. 1F illustrates an example of an input/output memory management unit, according to one or more embodiments.

Turning now to FIG. 1F, an example of an input/output memory management unit is illustrated, according to one or more embodiments. As shown, IOMMU 184 may include circuitry 126. In one or more embodiments, circuitry 126 may be configured to implement at least a portion of one or more systems, one or more flowcharts, one or more methods, and/or one or more processes described herein. As illustrated, IOMMU 184 may include registers 127A-127N. As shown, registers 127A-127N may be coupled to circuitry 126. In one or more embodiments, registers 127A-127N may store information. In one example, one or more of registers 127A-127N may store configuration information. In a second example, one or more of registers 127A-127N may store performance information. In another example, one or more of registers 127A-127N may store status information.

Figure 2:
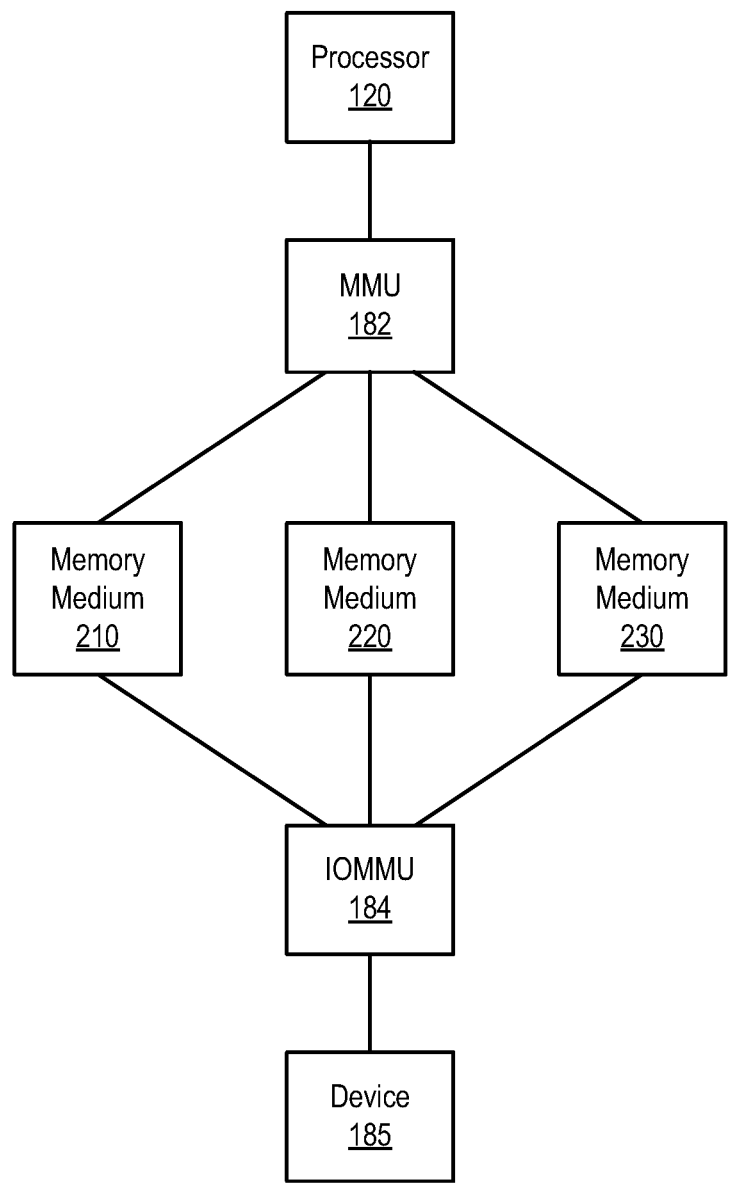
FIG. 2 illustrates examples of memory media coupled to an input/output memory management unit, according to one or more embodiments.

Turning now to FIG. 2, examples of memory media coupled to an input/output memory management unit are illustrated, according to one or more embodiments. In one or more embodiments, an IOMMU may be coupled to multiple different memory media. As shown, IOMMU 184 may be coupled to memory media 210-230. In one or more embodiments, a MMU may be coupled to multiple different memory media. As illustrated, MMU 182 may be coupled to memory media 210-230. In one or more embodiments, one or more of memory media 210-230 may include one or more structures and/or one or more functionalities of those described with reference to one or more of memory media 150-170. In one or more embodiments, one or more of memory media 210-230 may be external to IHS 110. In one or more embodiments, IHS 110 may include one or more of memory media 210-230. In one or more embodiments, a SPA may include addresses of one or more of memory media 210-230. For example, one or more of memory media 210-230 may be included in a SPA of IHS 110. In one instance, physical addresses associated with memory medium 210 may be or include a first portion of the SPA of IHS 110. In a second instance, physical addresses associated with memory medium 220 may be or include a second portion of the SPA of IHS 110, different from the first portion of the SPA of IHS 110. In another instance, physical addresses associated with memory medium 230 may be or include a third portion of the SPA of IHS 110, different from the first portion of the SPA of IHS 110 and different from the second portion of the SPA of IHS 110.

In one or more embodiments, IOMMU 184 may map virtual addresses utilized by device 185 to physical addresses of the SPA of IHS 110. In one example, IOMMU 184 may map virtual addresses utilized by device 185 to physical addresses of memory medium 210. In a second example, IOMMU 184 may map virtual addresses utilized by device 185 to physical addresses of memory medium 220. In another example, IOMMU 184 may map virtual addresses utilized by device 185 to physical addresses of memory medium 230. In one or more embodiments, IOMMU 184 may map virtual addresses utilized by device 185 to physical addresses of a first memory medium. For example, the first memory medium may be or include memory medium 220. In one or more embodiments, IOMMU 184 may remap the virtual addresses utilized by device 185 to physical addresses of a second memory medium. For example, the virtual addresses utilized by device 185 may not change when IOMMU 184 remaps the virtual addresses utilized by device 185 to the physical addresses of the second memory medium. In one instance, the second memory medium may be or include memory medium 210. In another instance, the second memory medium may be or include memory medium 220.

Figure 3:
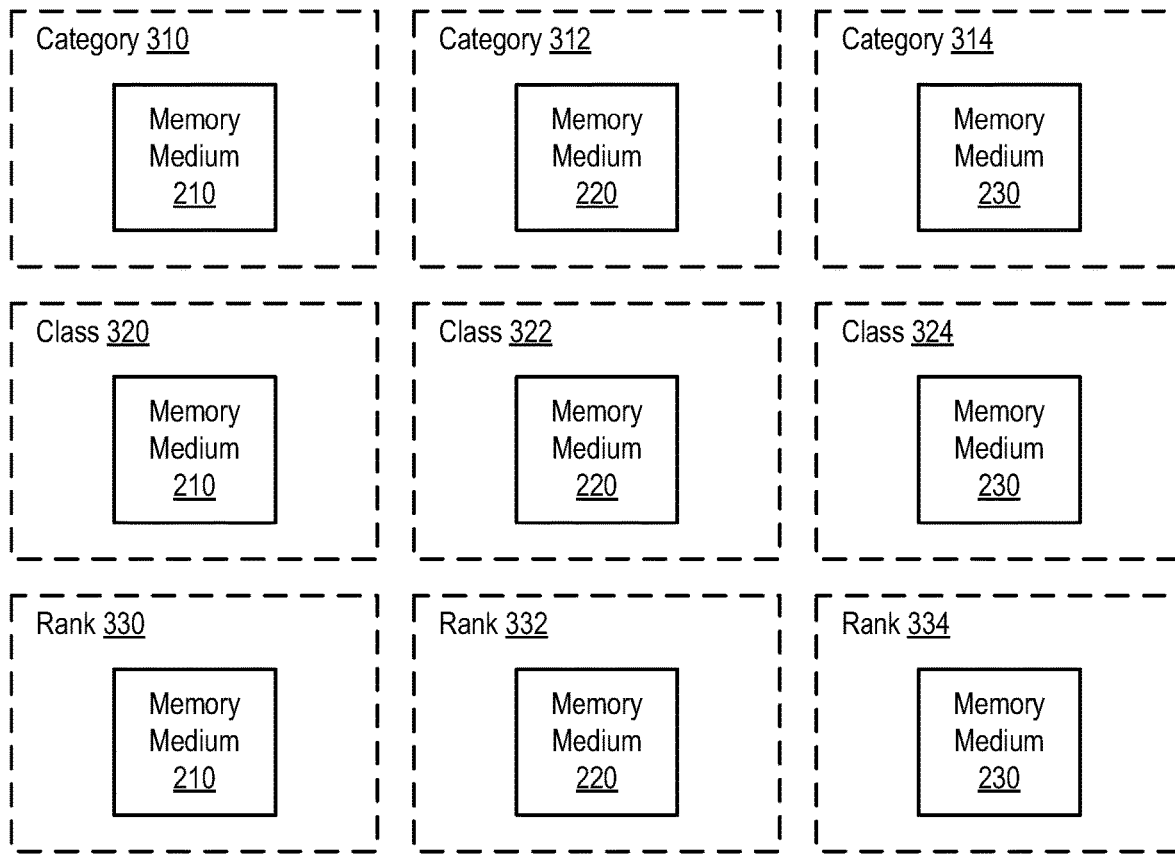
FIG. 3 illustrates examples of memory media, according to one or more embodiments.

Turning now to FIG. 3, examples of memory media are illustrated, according to one or more embodiments. As shown, memory media 210-230 may be categorized into respective categories 310-314. As illustrated, memory media 210-230 may be classified into respective classes 320-324. As shown, memory media 210-230 may be ranked into respective ranks 330-334. In one or more embodiments, a memory medium may be associated with one or more attributes. In one example, an attributed associated with a memory medium may be or include a latency. In a second example, an attributed associated with a memory medium may be or include an input/output data rate. In a third example, an attributed associated with a memory medium may be or include a storage capacity. In a fourth example, an attributed associated with a memory medium may be or include an endurance. In one instance, an endurance may include a number (e.g., a threshold number) of read cycles and/or write cycles. In another instance, an endurance may include a number (e.g., a threshold number) of read cycles and/or write cycles that may be performed with the memory medium before one or more performances of the memory medium degrades. In a fifth example, an attributed associated with a memory medium may be or include a power requirement. In another example, an attributed associated with a memory medium may be or include a thermal characteristic. In one or more embodiments, a memory medium may be categorized, classified, and/or ranked based at least on one or more attributes associated with the memory medium.

Figure 4:
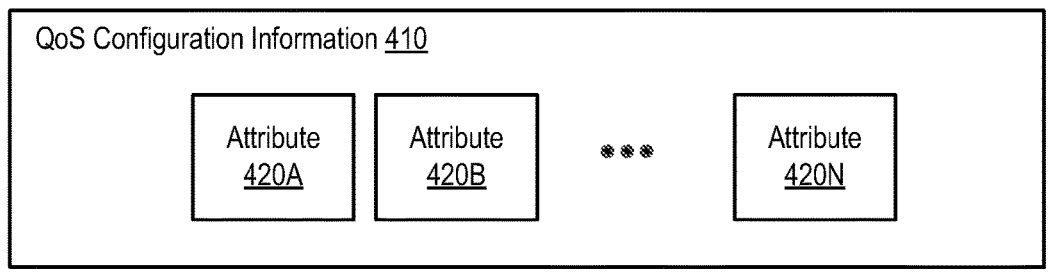
FIG. 4 illustrates an example of quality of service configuration information, according to one or more embodiments.

Turning now to FIG. 4, an example of quality of service configuration information is illustrated, according to one or more embodiments. As shown, QoS configuration information 410 may include attributes 420A-420N. In one or more embodiments, an attribute 420 may be associated with a latency. In one example, the latency may be or include a minimum amount of time that may transpire before data may be written to the memory medium. In another example, the latency may be or include a minimum amount of time that may transpire before data may be read from the memory medium. In one or more embodiments, an attribute 420 may be associated with an I/O throughput rate threshold. For example, the I/O throughput rate threshold may be or include a minimum I/O throughput rate of reading and/or writing data from and/or to a memory medium. In one or more embodiments, an attribute 420 may be associated with a storage capacity. For example, the storage capacity may be or include a minimum amount of storage available in a memory medium. In one or more embodiments, an attribute 420 may be associated with an endurance. For example, the endurance may be or include a minimum number of read and/or writes from and/or to a memory medium. In one or more embodiments, an attribute 420 may be associated with a power threshold. For example, the power threshold may be or include a maximum amount of power that a memory medium may utilize. In one or more embodiments, an attribute 420 may be associated with a thermal threshold. In one example, the thermal threshold may be or include a maximum temperature of the memory medium. In another example, the thermal threshold may be or include a minimum temperature of the memory medium.

Figure 5A:
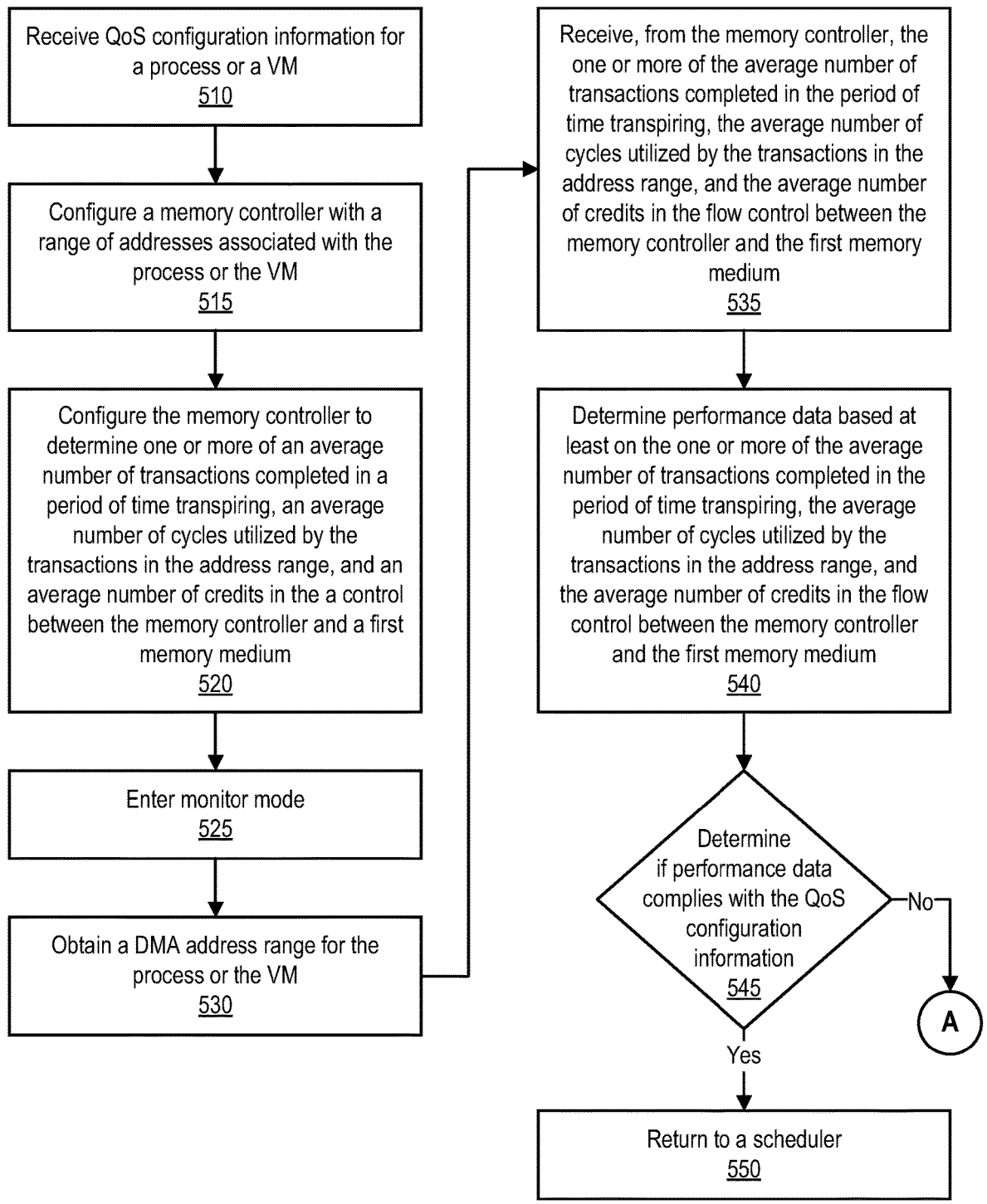
FIGS. 5A and 5B illustrate an example of a method of utilizing an input/output memory management unit, according to one or more embodiments.
Figure 5B:
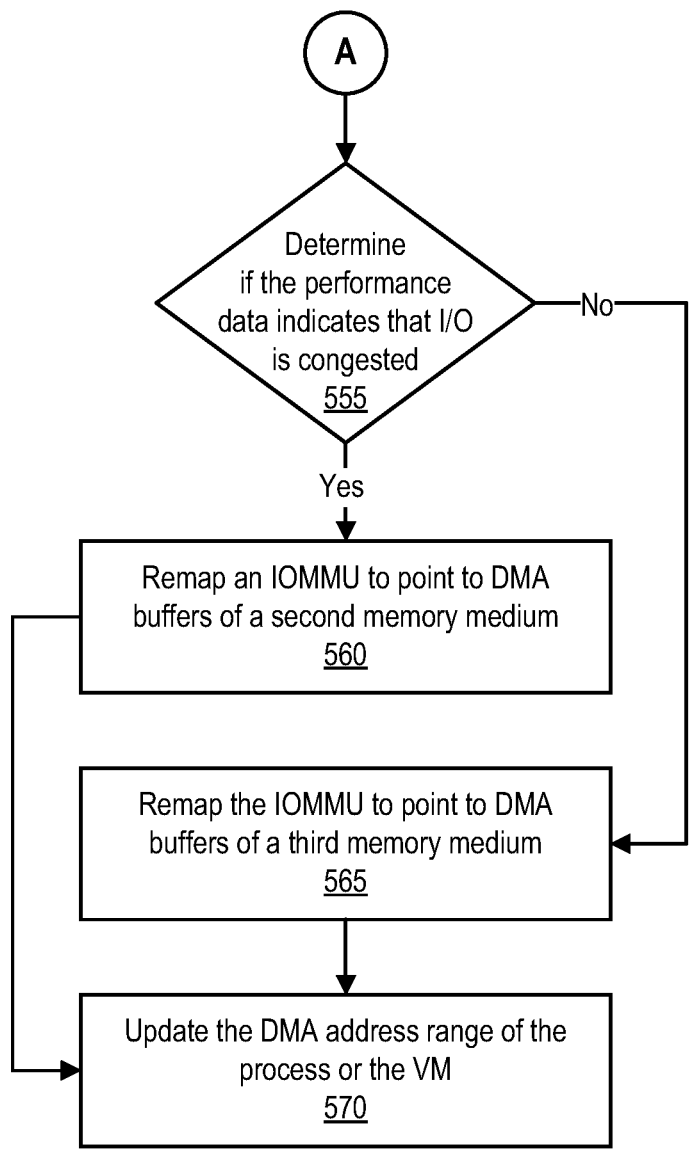

Turning now to FIGS. 5A and 5B, an example of a method of utilizing an input/output memory management unit is illustrated, according to one or more embodiments. In one or more embodiments, one or more of memory controller 122, IOMMU 184, BMC 190, and a thread of OS 162, among others, may be configured to perform at least a portion of the method described with reference to FIGS. 5A and 5B. At 510, QoS configuration information for a process or a virtual machine (VM) may be received. In one example, a process may be or include an application (APP) of APPs 164-166. In another example, the VM may be or include a VM of VMs 167 and 168. In one or more embodiments, the QoS configuration information may be utilized to configure one or more of registers 125A-125N of memory controller 122. In one or more embodiments, the QoS configuration information for the process or the VM may be or include QoS configuration information 410.

At 515, a memory controller may be configured with a range of addresses associated with the process or the VM. For example, memory controller 122 may be configured with a range of addresses associated with the process or the VM. In one or more embodiments, configuring the memory controller with a range of addresses associated with the process or the VM may include programming the memory controller with the range of addresses associated with the process or the VM. In one or more embodiments, configuring the memory controller with a range of addresses may include programming the memory controller with the range of addresses. In one or more embodiments, configuring the memory controller with a range of addresses may include configuring one or more registers of the memory controller with a range of addresses. For example, one or more of registers 125A-125N may be configured with a range of addresses associated with the process or the VM.

At 520, the memory controller may be configured to determine one or more of an average number of transactions completed in a period of time transpiring, an average number of cycles (e.g., memory bus cycles) utilized by the transactions in the address range, and an average number of credits in the flow control between the memory controller and a first memory medium. For example, the first memory medium may be or include memory medium 220. In one or more embodiments, configuring the memory controller to determine one or more of an average number of transactions completed in a period of time transpiring, an average number of cycles utilized by the transactions in the address range, and an average number of credits in the flow control between the memory controller and a first memory medium may include programming the memory controller to determine one or more of an average number of transactions completed in a period of time transpiring, an average number of cycles utilized by the transactions in the address range, and an average number of credits in the flow control between the memory controller and a first memory medium. In one or more embodiments, the first memory medium may be or include storage class memory.

At 525, a monitor mode may be entered. At 530, a DMA address range for the process or the VM may be obtained. For example, a DMA address range for the process or the VM may be obtained from IOMMU 184. For instance, the DMA address range for the process or the VM may be associated with one or more buffers associated with device 185. At 535, the one or more of the average number of transactions completed in the period of time transpiring, the average number of cycles utilized by the transactions in the address range, and the average number of credits in the flow control between the memory controller and the first memory medium may be received from the memory controller. In one or more embodiments, receiving the one or more of the average number of transactions completed in the period of time transpiring, the average number of cycles utilized by the transactions in the address range, and the average number of credits in the flow control between the memory controller and the first memory medium from the memory controller may include receiving the one or more of the average number of transactions completed in the period of time transpiring, the average number of cycles utilized by the transactions in the address range, and the average number of credits in the flow control between the memory controller and the first memory medium from circuitry 124 and/or from one or more of registers 125A-125N.

At 540, performance data may be determined based at least on the one or more of the average number of transactions completed in the period of time transpiring, the average number of cycles utilized by the transactions in the address range, and the average number of credits in the flow control between the memory controller and the first memory medium. In one or more embodiments, determining the performance data based at least on the one or more of the average number of transactions completed in the period of time transpiring, the average number of cycles utilized by the transactions in the address range, and the average number of credits in the flow control between the memory controller and the storage class memory may include determining the performance data from the one or more of the average number of transactions completed in the period of time transpiring, the average number of cycles utilized by the transactions in the address range, and the average number of credits in the flow control between the memory controller and the first memory medium.

At 545, it may be determined if the performance data complies with the QoS configuration information. In one or more embodiments, determining if the performance data complies with the QoS configuration information may include comparing one or more of attributes 420A-420N of QoS configuration information 410 with the performance data. For example, comparing one or more of attributes 420A-420N of QoS configuration information 410 with the performance data may include comparing one or more of attributes 420A-420N of QoS configuration information 410 with the one or more of the average number of transactions completed in the period of time transpiring, the average number of cycles utilized by the transactions in the address range, and the average number of credits in the flow control between the memory controller and the first memory medium.

If the performance data complies with the QoS configuration information, a scheduler may be returned to, at 550. If the performance data does not comply with the QoS configuration information, it may be determined if the performance data indicates that I/O is congested, at 555. In one or more embodiments, if the performance data does not comply with the QoS configuration information, an interrupt of memory controller 122 may be raised. For example, an interrupt handler associated with the raised interrupt may perform one or more of method elements 555-570. If the performance data indicates that the I/O is congested, an IOMMU may be remapped to point to DMA buffers of a second memory medium, at 560. For example, IOMMU 184 may be remapped to point to DMA buffers of a second memory medium. In one or more embodiments, the second memory medium may be different from the first memory medium. For example, the second memory medium may be or include memory medium 210. In one or more embodiments, the IOMMU may be remapped to point to the DMA buffers of the second memory medium based at least on one or more of a category, a class, and a rank, among others, associated with the second memory medium. For example, IOMMU 184 may be remapped to the DMA buffers of memory medium 210 based at least on one or more of category 310, class 320, and rank 330, among others, associated with memory medium 210.

In one or more embodiments, remapping the IOMMU to point to the DMA buffers of the second memory medium may include copying data to the DMA buffers of the second memory medium. For example, data stored via DMA buffers of the first memory medium may be copied to the DMA buffers of the second memory medium. In one or more embodiments, device 185 may utilize one or more virtual addresses. For example, the one or more virtual addresses may have been mapped to one or more physical addresses of the first memory medium. For instance, the one or more virtual addresses, utilized by device 185, may be mapped to one or more physical addresses of the second memory medium. In one or more embodiments, after remapping IOMMU 184 to point to the DMA buffers of the second memory medium, device 185 may continue to utilize the same one or more virtual addresses.

If the performance data does not indicate that the I/O is congested, the IOMMU may be remapped to point to DMA buffers of a third memory medium, at 565. For example, IOMMU 184 may be remapped to point to DMA buffers of a third memory medium. In one or more embodiments, the third memory medium may be different from the first memory medium and may be different from the second memory medium. For example, the third memory medium may be or include memory medium 230. In one or more embodiments, the IOMMU may be remapped to point to the DMA buffers of the third memory medium based at least on one or more of a category, a class, and a rank, among others, associated with the third memory medium. For example, IOMMU 184 may be remapped to the DMA buffers of memory medium 230 based at least on one or more of category 314, class 324, and rank 334, among others, associated with memory medium 230.

In one or more embodiments, remapping the IOMMU to point to the DMA buffers of the third memory medium may include copying data to the DMA buffers of the third memory medium. For example, data stored via DMA buffers of the first memory medium may be copied to the DMA buffers of the third memory medium. In one or more embodiments, device 185 may utilize one or more virtual addresses. For example, the one or more virtual addresses may have been mapped to one or more physical addresses of the first memory medium. For instance, the one or more virtual addresses, utilized by device 185, may be mapped to one or more physical addresses of the third memory medium. In one or more embodiments, after remapping IOMMU 184 to point to the DMA buffers of the third memory medium, device 185 may continue to utilize the same one or more virtual addresses.

At 570, the DMA address range of the process or the VM may be updated. In one example, the DMA address range of the process or the VM may be updated with information associated with the DMA buffers of the second memory medium, if the performance data indicates that the I/O is congested. In another example, the DMA address range of the process or the VM may be updated with information associated with the DMA buffers of the third memory medium, the performance data does not indicate that the I/O is congested.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
   at least one processor;
   a memory controller;
   a memory management unit (MMU);
   an input/output memory management unit (IOMMU) configured to be coupled to a device; and
   a plurality of memory media coupled to the memory controller and coupled to the IOMMU;
   wherein the memory controller is configured to:
      receive quality of service (QoS) configuration information associated with information storage and retrieval of the device;
      configure one or more registers of the memory controller with a range of addresses associated with a process or a virtual machine;
      determine one or more of an average number of transactions completed in a period of time transpiring, an average number of cycles utilized by the transactions in the address range, and an average number of credits in a flow control between the memory controller and a first memory medium of the plurality of memory media;
      obtain a direct memory access (DMA) address range associated with the device;
      determine performance data based at least on the one or more of the average number of transactions completed in the period of time transpiring, the average number of cycles utilized by the transactions in the address range, and the average number of credits in the flow control between the memory controller and the first memory medium;
      determine that the performance data does not comply with the QoS configuration information;
      determine if the performance data indicates that the information storage and retrieval of the device is congested;
      when the performance data indicates that the information storage and retrieval of the device is congested:
         remap the IOMMU to point to DMA buffers of a second memory medium of the plurality of memory media, different from the first memory medium; and
         remap the MMU to point to the DMA buffers of the second memory medium; and
      when the performance data does not indicate that the information storage and retrieval of the device is congested:
         remap the IOMMU to point to DMA buffers of a third memory medium of the plurality of memory media, different from the first memory medium and different from the second memory medium; and
         remap the MMU to point to the DMA buffers of the third memory medium.

2. The information handling system of claim 1, wherein a latency associated with the second memory medium is less than a latency associated with the first memory medium and is less than a latency associated with the third memory medium.

3. The information handling system of claim 1, wherein a data throughput associated with the second memory medium is greater than a data throughput associated with the first memory medium and greater than a data throughput associated with the third memory medium.

4. The information handling system of claim 1, wherein a latency associated with the third memory medium is greater than a latency associated with the first memory medium.

5. The information handling system of claim 1, wherein the first memory medium includes storage class memory.

6. The information handling system of claim 1, wherein the device includes at least one of a graphics processing unit (GPU), a peripheral component interconnect express (PCIe) device, a small computer system interface (SCSI) device, a serial attached SCSI (SAS) device, a universal serial bus (USB) device, a storage device, a fabric bus, a network interface, a host bus adapter, a device coupled to a docking station, the docking station, an Institute of Electrical and Electronics Engineers (IEEE) 1394 device, a serial advanced technology attachment (SATA) device, and an image acquisition device.

7. A method, comprising:
   receiving quality of service (QoS) configuration information associated with information storage and retrieval of a device coupled to an input/output memory management unit (IOMMU) of an information handling system;
   configuring a memory controller of the information handling system with a range of addresses associated with a process or a virtual machine;
   configuring the memory controller to determine one or more of an average number of transactions completed in a period of time transpiring, an average number of cycles utilized by the transactions in the address range, and an average number of credits in a flow control between the memory controller and a first memory medium;
   obtaining a direct memory access (DMA) address range associated with the device;
   determining performance data based at least on the one or more of the average number of transactions completed in the period of time transpiring, the average number of cycles utilized by the transactions in the address range, and the average number of credits in the flow control between the memory controller and the first memory medium;
   determining that the performance data does not comply with the QoS configuration information;
   determining if the performance data indicates that the information storage and retrieval of the device is congested;
   when the performance data indicates that the information storage and retrieval of the device is congested:
      remapping the IOMMU to point to DMA buffers of a second memory medium, different from the first memory medium; and
      remapping a memory management unit (MMU) of the information handling system to point to the DMA buffers of the second memory medium; and
   when the performance data does not indicate that the information storage and retrieval of the device is congested:
      remapping the IOMMU to point to DMA buffers of a third memory medium, different from the first memory medium and different from the second memory medium; and
      remapping the MMU to point to the DMA buffers of the third memory medium.

8. The method of claim 7, wherein a latency associated with the second memory medium is less than a latency associated with the first memory medium and is less than a latency associated with the third memory medium.

9. The method of claim 7, wherein a data throughput associated with the second memory medium is greater than a data throughput associated with the first memory medium and greater than a data throughput associated with the third memory medium.

10. The method of claim 7, wherein a latency associated with the third memory medium is greater than a latency associated with the first memory medium.

11. The method of claim 7, wherein the first memory medium includes storage class memory.

12. The method of claim 7, wherein the device includes at least one of a graphics processing unit (GPU), a peripheral component interconnect express (PCIe) device, a small computer system interface (SCSI) device, a serial attached SCSI (SAS) device, a universal serial bus (USB) device, a storage device, a fabric bus, a network interface, a host bus adapter, a device coupled to a docking station, the docking station, an Institute of Electrical and Electronics Engineers (IEEE) 1394 device, a serial advanced technology attachment (SATA) device, and an image acquisition device.

13. An memory controller, configured to:
   receive quality of service (QoS) configuration information associated with information storage and retrieval of a device coupled to an input/output memory management unit (IOMMU) of an information handling system;
   configure one or more registers of the memory controller with a range of addresses associated with a process or a virtual machine;
   determine one or more of an average number of transactions completed in a period of time transpiring, an average number of cycles utilized by the transactions in the address range, and an average number of credits in a flow control between the memory controller and a first memory medium of a plurality of memory media coupled to the memory controller;
   obtain a direct memory access (DMA) address range associated with the device;
   determine performance data based at least on the one or more of the average number of transactions completed in the period of time transpiring, the average number of cycles utilized by the transactions in the address range, and the average number of credits in the flow control between the memory controller and the first memory medium;
   determine that the performance data does not comply with the QoS configuration information;
   determine if the performance data indicates that the information storage and retrieval of the device is congested;
   when the performance data indicates that the information storage and retrieval of the device is congested:
      remap the IOMMU to point to DMA buffers of a second memory medium of the plurality of memory media, different from the first memory medium; and
      remap a memory management unit (MMU) of the information handling system to point to the DMA buffers of the second memory medium; and
   when the performance data does not indicate that the information storage and retrieval of the device is congested:
      remap the IOMMU to point to DMA buffers of a third memory medium of the plurality of memory media, different from the first memory medium and different from the second memory medium; and
      remap the MMU to point to the DMA buffers of the third memory medium.

14. The memory controller of claim 13, wherein a latency associated with the second memory medium is less than a latency associated with the first memory medium and is less than a latency associated with the third memory medium.

15. The memory controller of claim 13, wherein a data throughput associated with the second memory medium is greater than a data throughput associated with the first memory medium and greater than a data throughput associated with the third memory medium.

16. The memory controller of claim 13, wherein the first memory medium includes storage class memory.

17. The memory controller of claim 13, wherein the device includes at least one of a graphics processing unit (GPU), a peripheral component interconnect express (PCIe) device, a small computer system interface (SCSI) device, a serial attached SCSI (SAS) device, a universal serial bus (USB) device, a storage device, a fabric bus, a network interface, a host bus adapter, a device coupled to a docking station, the docking station, an Institute of Electrical and Electronics Engineers (IEEE) 1394 device, a serial advanced technology attachment (SATA) device, and an image acquisition device.

* * * * *